(12) United States Patent
Kogiso et al.

(10) Patent No.: US 6,725,965 B2
(45) Date of Patent: Apr. 27, 2004

(54) STABLE ELECTRIC POWER STEERING SYSTEM

(75) Inventors: Yoshinori Kogiso, Mizunami (JP); Akira Kani, Kani (JP); Hisazumi Ishikawa, Tajimi (JP)

(73) Assignee: Kayaba Industry Co., Ltd., Tokyo (JP)

( * ) Notice: Subject to any disclaimer, the term of this patent is extended or adjusted under 35 U.S.C. 154(b) by 202 days.

(21) Appl. No.: 10/021,623

(22) Filed: Dec. 12, 2001

(65) Prior Publication Data

US 2003/0106736 A1 Jun. 12, 2003

(51) Int. Cl.$^7$ ................................................. B62D 5/04
(52) U.S. Cl. ...................................................... 180/446
(58) Field of Search ................................ 180/443, 446; 701/41, 42

(56) References Cited

U.S. PATENT DOCUMENTS

| | | | | |
|---|---|---|---|---|
| 4,753,309 A | * | 6/1988 | Marumoto et al. | 180/446 |
| 5,198,981 A | * | 3/1993 | Collier-Hallman et al. | 701/42 |
| 5,469,357 A | * | 11/1995 | Nishimoto | 701/41 |
| 5,473,231 A | * | 12/1995 | McLaughlin et al. | 318/433 |
| 5,482,129 A | * | 1/1996 | Shimizu | 180/446 |
| 5,504,403 A | * | 4/1996 | McLaughlin | 318/432 |
| 5,528,497 A | * | 6/1996 | Yamamoto et al. | 701/41 |
| 5,631,529 A | * | 5/1997 | Shimizu et al. | 318/432 |
| 5,659,473 A | * | 8/1997 | Noro et al. | 701/42 |
| 5,809,438 A | * | 9/1998 | Noro et al. | 701/41 |
| 5,894,205 A | * | 4/1999 | Shimizu et al. | 318/432 |
| 5,992,557 A | * | 11/1999 | Nakamura et al. | 180/446 |
| 6,112,846 A | * | 9/2000 | Mukai et al. | 180/446 |

FOREIGN PATENT DOCUMENTS

| | | |
|---|---|---|
| JP | 05-003108 | 1/1993 |
| JP | 10-247602 | 9/1998 |
| JP | 11-111511 | 4/1999 |
| JP | 2000-146720 | 5/2000 |
| JP | 2001-039324 | 2/2001 |

* cited by examiner

*Primary Examiner*—Lesley D. Morris
*Assistant Examiner*—Paul Royal, Jr.
(74) *Attorney, Agent, or Firm*—The Maxham Firm (57) ABSTRACT

An electric power steering system remaining stable when subjected to forces from the road surface, the engine or motor, or from other sources. The electric power steering system has a torque sensor for outputting a signal corresponding to the value of the steering torque, a derivative component for outputting a signal obtained by differentiating the output signal of the torque sensor, a driver for electrically driving an assist apparatus which assists a steering force, an assist current determining component for determining current flowing to the driver in accordance with the output signal of the torque sensor and the output signal of the derivative, and a gain control for setting a gain of the derivative component to zero or reducing the gain when the output signal of the torque sensor is smaller than a predetermined value. Methods to provide a stable steering system are also part of the subject matter.

8 Claims, 8 Drawing Sheets

Fig. 1

Steering torque - derivative gain characteristics

Fig. 2

Differentiation - derivative gain characteristics

Fig. 3

Steering torque - first basic assist current characteristics

Fig. 4

Steering torque - derivative gain characteristics

Steering torque - derivative gain characteristics

Fig. 8

Differentiation - derivative gain characteristics

Fig. 9

Differentiation - derivative gain characteristics

PRIOR ART

Fig. 12 PRIOR ART

STABLE ELECTRIC POWER STEERING SYSTEM

BACKGROUND OF THE INVENTION

1. Field of the Invention

The present invention generally relates to an electric power steering system of a vehicle. More particularly, this invention relates to an electric power steering system that remains stable even when subjected to forces, such as vibrations received from road surface, from a motor or engine or other source.

2. Discussion of the Related Art

A power steering system is mounted to an automobile (or any vehicle) to assist the steering by reducing the steering force required by a driver. Electric power steering systems, as compared to conventional non-electric systems, are smaller in size and have lighter weight. Also, the number of constituent parts is relatively small.

An electric power steering system generally comprises a torque sensor for outputting a signal corresponding to a value of the steering torque of the driver, an electric motor (a kind of drive means) for driving an assist apparatus which assists the steering force, and an electronic control unit (ECU) for determining current flowing through the electric motor in accordance with the output signal of the torque sensor. That is, as the driver turns the steering wheel, the torque sensor outputs a signal corresponding to a value of the steering torque generated. The ECU determines the assist current and the electric motor drives the assist apparatus based on the torque corresponding to the assist current.

However, the problem is that such a torque sensor usually detects not only the steering torque generated by the driver's steering operation, but also vibration received from the road surface or generated by an internal combustion engine or motor or other source of vibration. If such vibration is detected by the torque sensor, then that vibration produces a noise component that is also included in the assist current. That is, the assist force is varied also in relation to the vibration. In this case, the steering becomes unstable.

Accordingly, there is a need for an electric power steering system that is not influenced by vibration and which remains stable. The present invention satisfies this need and provides related advantages as well.

SUMMARY OF THE INVENTION

It is a purpose of the present invention to provide an electric power steering system capable of keeping the steering stable even when a torque sensor detects vibration forces other than those input by the driver, such as received from road surface, from vibrations generated from a motor or engine, or from other sources of vibrations.

As used herein, the term "stable," when used in reference to the electric power steering system, refers to the system only responding to the input of the driver and not to external forces, such as vibrations.

To achieve the above purpose, a first aspect of the present invention provides an electric power steering system having a torque sensor for outputting a signal corresponding to a value of a steering torque, a derivative means for outputting a signal obtained by differentiating the output signal of the torque sensor, a driving means for electrically driving an assist apparatus which assists a steering force, and an assist current determining means for determining current flowing to the drive means in accordance with the output signal of the torque sensor and the output signal of the derivative means. The electric power steering system further has gain control means for setting a gain of the derivative means to zero or reducing the gain when the output signal of the torque sensor is smaller than a predetermined value.

According to the electric power steering system of the first aspect, the signal corresponding to the steering torque is output by the torque sensor, and the signal obtained by differentiating the output signal of the torque sensor is output by the derivative means. The assist apparatus for assisting the steering force is electrically driven by the drive means, but the current flowing to the drive means is determined by the assist current determining means in accordance with the output signal of the torque sensor and the output signal of the derivative means. When the output signal of the torque sensor is smaller than the differential value, the gain of the derivative means is set to zero or reduced by the gain control means. Thus, even if the torque sensor detects vibrations received from the road surface or vibrations generated from the motor or engine, this noise component is prevented from being included in the assist current, so as to prevent the assist force from varying with the vibration. Thus, it is possible to prevent the steering from being unstable so that the vehicle drives straight.

As described above, the torque sensor detects the vibration, but if the vibrations detected by the torque sensor are high frequency, the time between the instant when the steering torque is detected and the instant when the steering force is assisted becomes relatively long, and the assist force is adversely applied in a direction opposite from a direction to which the steering torque is applied. However, even in such a case, it is possible to prevent the steering from being unstable.

A second aspect of the present invention provides an electric power steering system having a torque sensor for outputting a signal corresponding to a value of a steering torque, a derivative means for outputting a signal obtained by differentiating the output signal of the torque sensor, a driving means for electrically driving an assist apparatus which assists a steering force, and an assist current determining means for determining current flowing to the drive means in accordance with the output signal of the torque sensor and the output signal of the derivative means. The electric power steering system further has second gain control means for setting a gain of the derivative means to zero or reducing the gain when the output signal of the derivative means is smaller than a predetermined value.

According to the electric power steering system of the second aspect, the signal corresponding to the steering torque is output by the torque sensor, and the signal obtained by differentiating the output signal of the torque sensor is output by the derivative means. The assist apparatus for assisting the steering force is electrically driven by the drive means, but the current flowing to the drive means is determined by the assist current determining means in accordance with the output signal of the torque sensor and the output signal of the derivative means. When the output signal of the derivative means is smaller than the differential value, which occurs when the variations amount per unit time of the steering torque are smaller than the predetermined value, the gain of the derivative means is set to zero or reduced by the second gain control means even if a steering torque equal to or greater than the predetermined magnitude is applied. Thus, even if the torque sensor detects vibrations received from the road surface or vibrations generated from the motor, it is possible to prevent that noise component from being included in the current flowing to the drive means, so as to prevent the assist force from being varied in terms of vibrations. Thus, it is also possible to prevent the steering from being unstable when the vehicle is turning.

As described above, the torque sensor detects the vibrations, but if the vibrations detected by the torque sensor are high frequency, the delay time (the time between the instant when the steering torque is detected and the instant when the steering force is assisted) becomes relatively long, and the assist force is adversely applied in a direction opposite from a direction to which the steering torque is applied. However, even in such a case, it is possible to prevent the steering from being unstable.

According to a third aspect of the present invention, in the electric power steering system of the second aspect, the system further has gain control means for setting a gain of the derivative means to zero or reducing the gain when the output signal of the torque sensor is smaller than a predetermined value.

The electric power steering system of the third aspect functions in the same manner as that of the second aspect, and when the output signal of the torque sensor is smaller than the predetermined value, the gain of the derivative means is set to zero or reduced by the gain control means. Thus, even if the torque sensor detects vibrations received from the road surface or vibrations generated from the motor, it is possible to prevent that noise component from being included in the current flowing to the drive means, so as to prevent the assist force from being varied in terms of vibrations. Thus, it is possible to prevent the steering from being unstable when the vehicle drives straight.

According to a fourth aspect of the present invention, in the electric power steering system of any one of the first to third aspects, the system further has second assist current determining means for setting a value of current flowing to the drive means to zero amps (0A).

The electric power steering system of the fourth aspect functions in the same manner as that of the first, second or third aspects. When the output signal of the torque sensor is smaller than the predetermined value, since the value of current flowing to the drive means is determined as 0A by the second assist current determining means, the result is that the steering remains stable. This is the case when vibrations received from the road surface or vibrations generated from the motor are detected by the torque sensor even if the gain of the derivative means is set to zero by the gain control means or the second gain control means.

The invention also provides methods for producing a stable electric power steering system by inputting a steering torque into the electric power steering system by an operator, subjecting the electric power steering system to forces other than those input by the operator, outputting a signal corresponding to a value of a steering torque from a torque sensor, outputting a signal obtained by differentiating the output signal of said torque sensor from a derivative means, electrically driving an assist apparatus which assists a steering force using a driving means, determining current flowing to said drive means in accordance with the output signal of said torque sensor and the output signal of the derivative means using an assist current determining means, and setting a gain of the derivative means to zero or reducing the gain when the output signal of the torque sensor is smaller than a predetermined value using a gain control means. This electric power steering system remains stable even when subjected to various other forces, for example vibrations from the road surface, the engine or the motor, as well as from other sources. It is also contemplated herein that the electric power steering system remains stable even when the forces other than those input by the operator are nonexistent.

BRIEF DESCRIPTION OF THE DRAWING

The present invention is described in further detail hereinbelow using the accompanying drawing, in which.

DETAILED DESCRIPTION OF THE PREFERRED EMBODIMENTS

Figure 11:
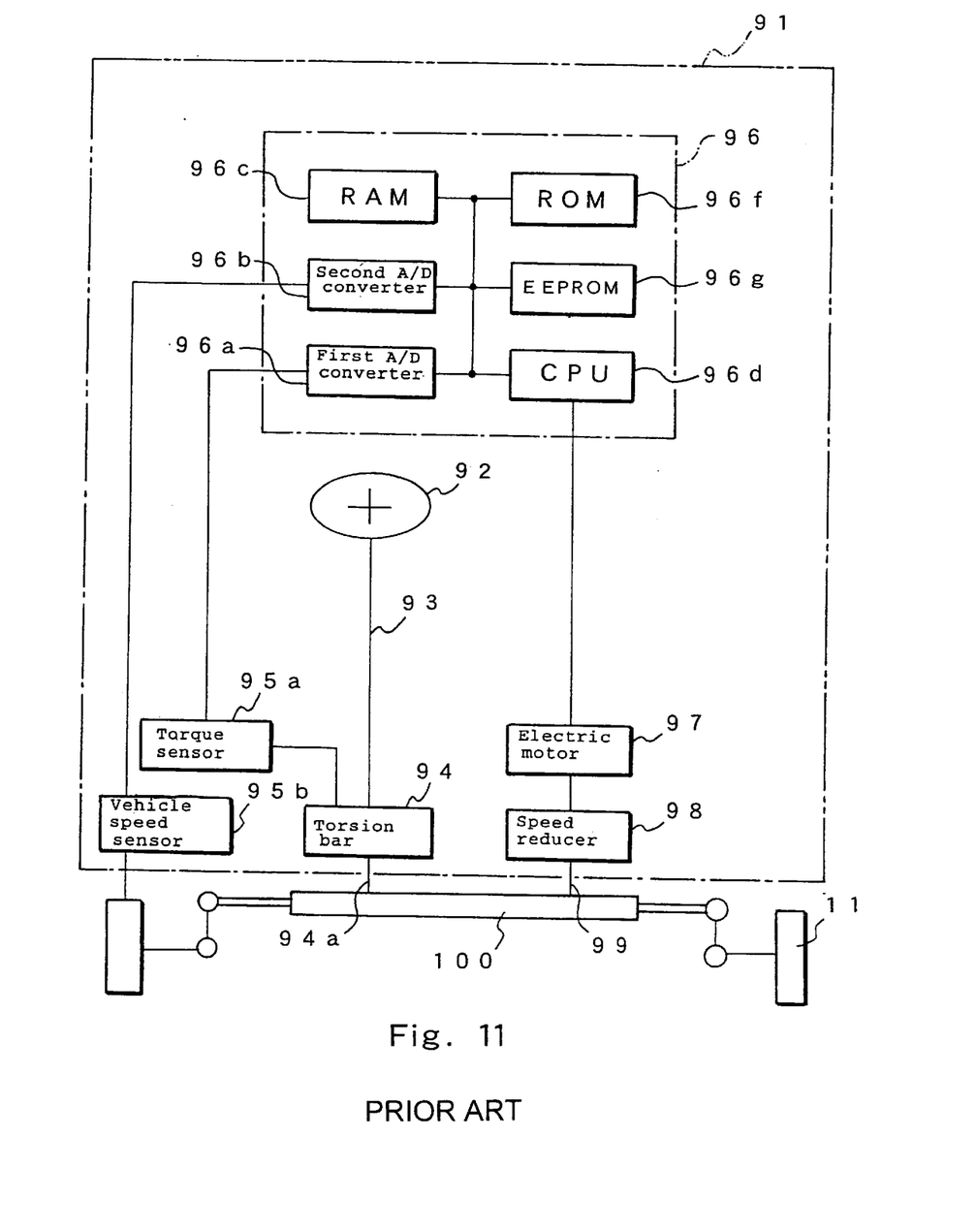
FIG. 11 is a block diagram of a conventional electric power steering system.

To clarify a difference between the present invention and the prior art, the prior art will be explained below. FIG. 11 is a block diagram of a conventional electric power steering system 91. As shown in FIG. 11, conventional electric power steering system 91 mainly comprises steering wheel 92, steering shaft 93, torsion bar 94, torque sensor 95a, vehicle speed sensor 95b, ECU 96, electric motor 97 and speed reducer 98.

Steering wheel 92 is steered (or turned) by a driver, and transmits its steering torque (turning torque) to steering shaft 93. Steering shaft 93 transmits the steering torque of steering wheel 92 to torsion bar 94. Steering wheel 92 is mounted to an upper end of steering shaft 93. Torsion bar 94 is mounted to a lower end of steering shaft 93, and transmits the steering torque of steering wheel 92 through steering shaft 93 to pinion 94a. Here, when the steering torque of steering wheel 92 is transmitted to pinion 94a from steering shaft 93, a torsion force is generated in torsion bar 94, and the steering torque in a circumferential direction by the torsion force of torsion bar 94 is converted into a sliding amount in its axial direction.

Torque sensor 95a outputs voltage having magnitude corresponding to the sliding amount of torsion bar 94 in its axial direction, that is, the steering torque by the driver. Vehicle speed sensor 95b outputs voltage of magnitude corresponding to speed of vehicle. A potentiometer is used as torque sensor 95a in many cases.

ECU 96 controls a value of current flowing through electric motor 97 (the assist current value), based on an output voltage value of torque sensor 95a and an output voltage value of vehicle speed sensor 95b. By controlling the assist current value in this manner, it is possible to control a force for assisting the steering force (the assist force). ECU 96 comprises first A/D converter 96a, second A/D converter 96b, RAM 96c, CPU 96d, a motor driving circuit, ROM 96f and EEPROM 96g.

First A/D converter 96a converts output voltage of torque sensor 95a into a digital value. Second A/D converter 96b converts output voltage of vehicle speed sensor 95b into a digital value. RAM 96c is a volatile memory whose data can be rewritten, and stores an output voltage value of torque sensor 95a converted into a digital value by first A/D converter 96a, and stores an output voltage value of vehicle speed sensor 95b converted into a digital value by second A/D converter 96b. EEPROM 96g is a nonvolatile memory whose data can be rewritten, and various data is previously stored in this EEPROM. A portion of the various data stored in the EEPROM will be explained below.

First, data concerning magnitude of the steering torque and data concerning a first basic assist current value corresponding to the magnitude of the steering torque are associated with each other and stored in EEPROM 96g. Second, data concerning magnitude of the vehicle speed and data concerning vehicle speed corresponding ratio (Kv), corresponding to the magnitude of the vehicle speed, are associated with each other and stored in the EEPROM. Here, the first basic assist current is a value which becomes an element for determining the assist current value (current value flowing to electric motor 97). The vehicle speed corresponding ratio is a coefficient which is multiplied by a current value determined by basic assist current determining processing 101a (FIG. 12).

Figure 12:
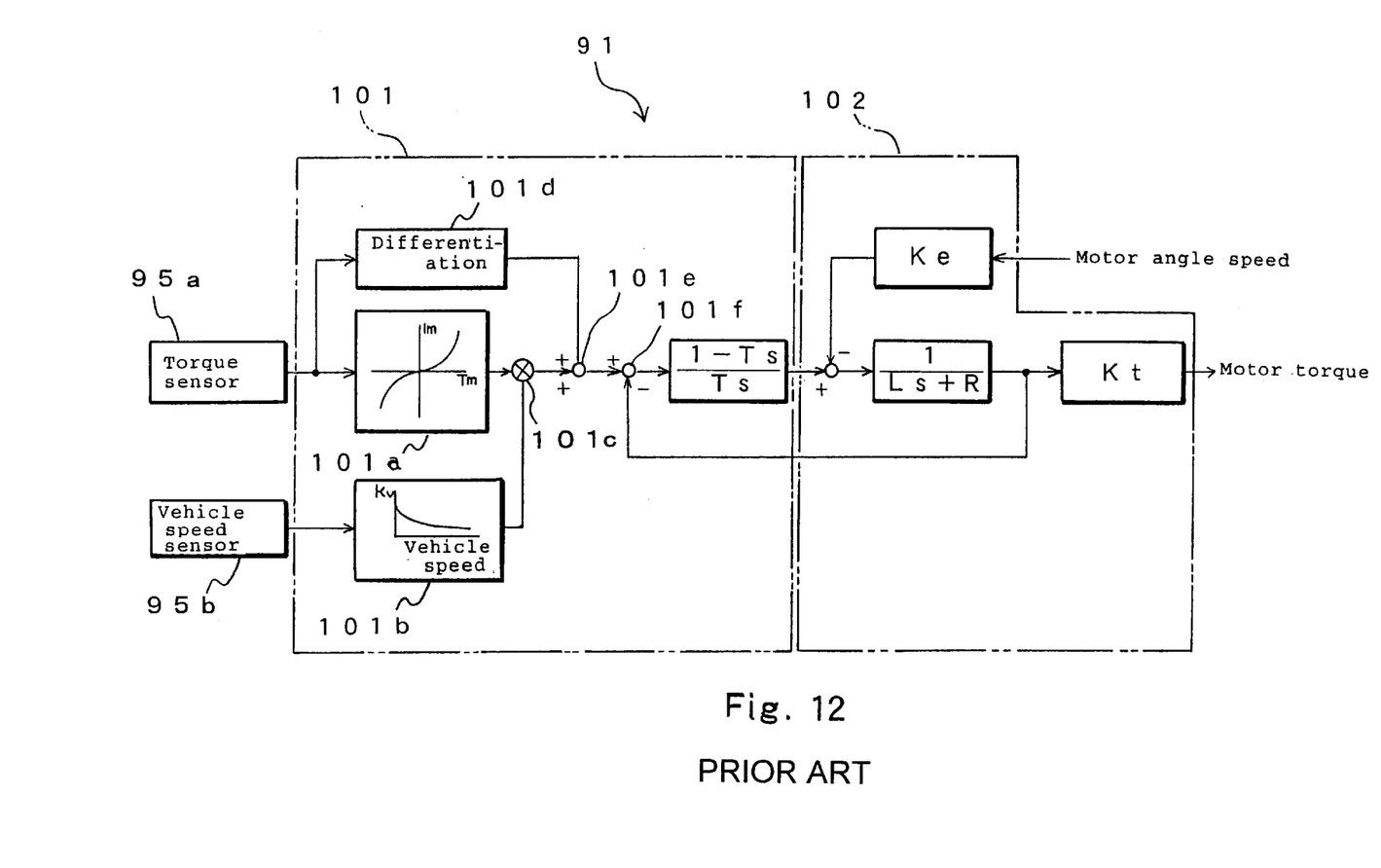
FIG. 12 is a basic control block diagram of a conventional electric power steering system.

In reference to FIG. 12, ROM 96f is a volatile memory whose data cannot be rewritten, and stores a control program and the like executed by conventional electric power steering system 91. ROM 96f stores all of control programs concerning basic assist current determining processing 101a, vehicle speed corresponding ratio determining processing 101b, vehicle speed corresponding ratio multiplying processing 101c, auxiliary assist current determining processing 101d, auxiliary assist current adding processing 101e, and feedback processing 101f.

CPU 96d detects an output voltage value of torque sensor 95a converted into a digital value by first A/D converter 96a, and an output voltage value of vehicle speed sensor 95b converted into a digital value by second A/D converter 96b in accordance with the control program stored in ROM 96f at predetermined time intervals (for every 1 ms in this embodiment), and executes processing for determining the current value flowing to electric motor 97 based on the detected output voltage value. The magnitude of current flowing to electric motor 97 is proportional to the magnitude of torque (assist force) output from electric motor 97. That is, CPU 96d determines the assist force in accordance with the output voltage value of torque sensor 95a.

Electric motor 97 transmits the assist force to rack 100 through assist pinion 99 mounted to speed reducer 98 by driving the speed reducer. The steering force transmitted through pinion 99 is assisted by the assist force transmitted to rack 100 in this manner. The direction of tire 11 is changed by the combination of the assist force and the steering force.

Next, processing executed by conventional electric power steering 91 will be explained with reference to FIG. 12. FIG. 12 is a basic control block diagram of conventional electric power steering system 91. As shown in FIG. 12, the processing comprises processing 101 executed in ECU 96, and processing 102 executed by electric motor 97. Processing 101 executed by ECU 96 will be explained further.

Processing 101 executed by ECU 96 mainly includes basic assist current determining processing 101a, vehicle speed corresponding ratio determining processing 101b, vehicle speed corresponding ratio multiplying processing 101c, auxiliary assist current determining processing 101d, auxiliary assist current adding processing 101e and feedback processing 101f.

Basic assist current determining processing 101a determines the first basic assist current value in accordance with a value of output of the torque sensor 95a, that is, in accordance with magnitude of the steering torque of the driver. Basic assist current determining processing 101a will be explained in detail. Processing 101a determines, as the first basic assist current value, data concerning the assist current value corresponding to magnitude (output signal value of torque sensor 95a) of the steering torque from data stored in EEPROM 96g. The first basic assist current value is set to a value which is substantially proportional to the square of a value of the output signal of torque sensor 95a.

Vehicle speed corresponding ratio determining processing 101b determines the vehicle speed corresponding ratio (Kv) in accordance with a value of the output signal of vehicle speed sensor 95b, in accordance with magnitude of the vehicle speed. More specifically, from data stored in EEPROM 96g, data concerning the vehicle speed corresponding ratio corresponding to the magnitude of vehicle speed (output signal value of vehicle speed sensor 95b) is determined as the vehicle speed corresponding ratio. The data stored in EEPROM 96g is set such that when a value of the output signal of vehicle speed sensor 95b is zero, the vehicle speed corresponding ratio is the greatest, and as the value of the output signal of vehicle speed sensor 95b becomes smaller, the vehicle speed corresponding ratio becomes smaller. This is because that at the time of steering operation of the vehicle when the vehicle speed is zero, that is, when the vehicle is stopped, the greatest steering force is required.

Vehicle speed corresponding ratio multiplying processing 101c is processing for multiplying the first basic assist current value by the vehicle speed corresponding ratio determined by the vehicle speed corresponding ratio determining processing. A value multiplied by the vehicle speed corresponding ratio is referred to as "second basic assist current value" in this description.

Auxiliary assist current determining processing 101d is processing to differentiate the output signal of torque sensor 95a. Auxiliary assist current adding processing 101e adds, to the basic assist current value, a value (differential value of the output signal of torque sensor 95a) of the output signal of torque sensor 95a differentiated by auxiliary assist current determining processing 101d. The second basic assist current value after the differential value of the output signal of torque sensor 95a was added is a value (assist current value) of current flowing to electric motor 97. There are two reasons for adding the differential value of the output signal of torque sensor 95a to the second basic assist current value.

The first reason is that it is advantageous to shorten the time (the delay time) between the instant when torque sensor 95a detects the steering torque and the instant when the assist force is transmitted to rack 100 through assist pinion 99. That is, it is desirable to quicken the response of the assist. Therefore, even if the steering torque detected by torque sensor 95a is abruptly varied, or varied rapidly, it is possible to assist the steering force by the assist force corresponding to the abruptly varied steering torque.

The second reason is that it is advantageous to prevent conventional electric power steering system 91 from being oscillated. The oscillation is generated when the gain is 1 (0dB) and the phase is reversed through 180°. Thus, the phase is allowed to advance through 90° to prevent the oscillation.

Feedback processing 101f holds the current value flowing to electric motor 97 constant, and feeds back a value of current flowing to the electric motor to the assist current value. If electric motor 97 rotates, it adversely generates electricity like a generator. Thus, the current value flowing to the electric motor becomes small, and the steering force is assisted with an assist force smaller than the assist force corresponding to the steering torque.

Conventional electric power steering 91 having the above-described construction has the following problems. That is, torque sensor 95a detects not only the steering torque generated by the driver's steering operation of the steering wheel, but it also detects vibrations received from the road surface or generated by an internal combustion engine or motor, and other vibrations in some cases. If the latter vibrations are detected by the torque sensor, the noise component due to the vibrations is included in the assist current. That is, the assist force is also varied in terms of vibration. Thus, the steering becomes unstable.

The present invention relates to an electric power steering system capable of solving such problems. A preferred embodiment of the present invention will be explained with reference with the accompanying figures. The same parts as the above-described conventional electric power steering system 91 are designated with the same symbols, explanation thereof is omitted, and only different portions are explained.

Figure 1:
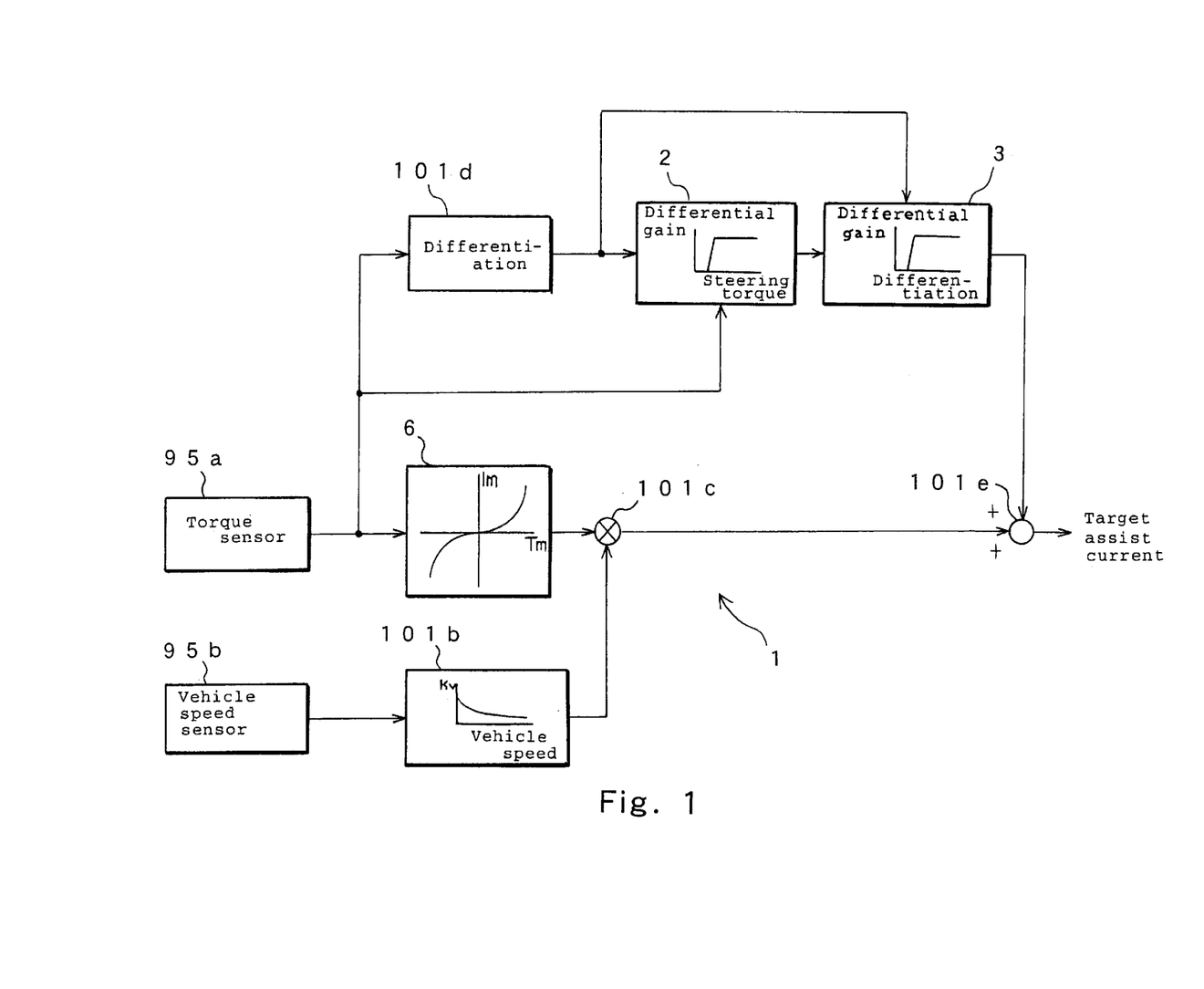
FIG. 1 is a basic control block diagram of an electric power steering system according to an embodiment of the present invention.
Figure 2:
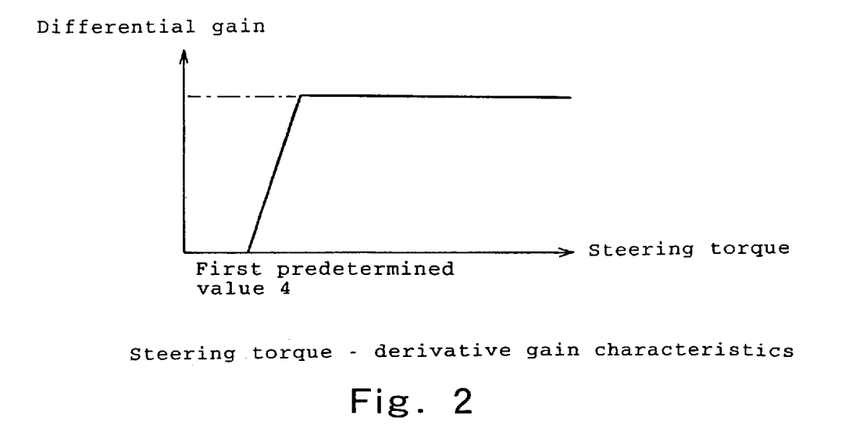
FIG. 2 shows steering torque—derivative gain characteristics of the electric power steering system of the invention.
Figure 3:
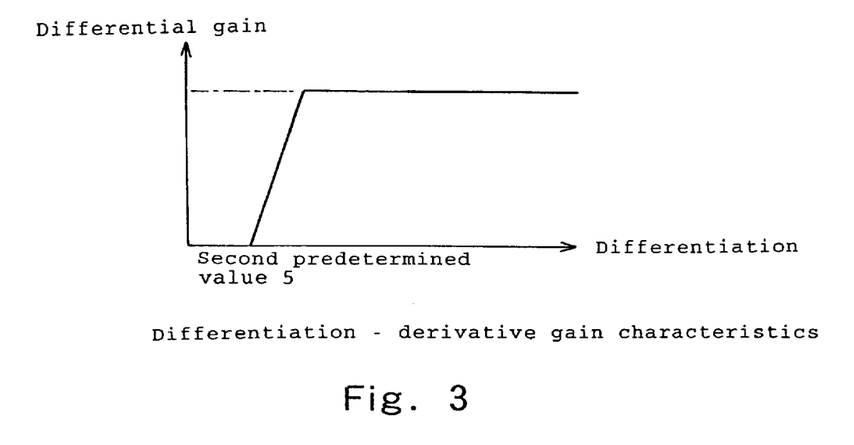
FIG. 3 shows differentiation—derivative gain characteristics of the electric power steering system of the invention.
Figure 4:
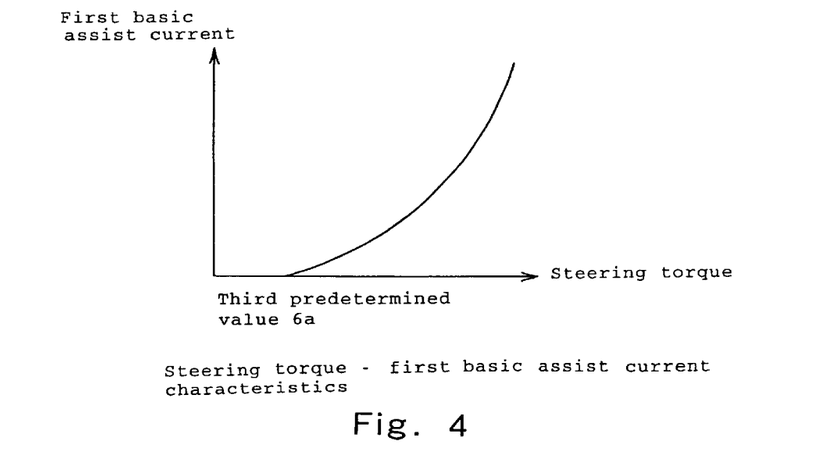
FIG. 4 shows steering torque—first basic assist current characteristics of the electric power steering system of the invention.

FIG. 1 is a basic control block diagram of electric power steering system 1 of the invention, and FIGS. 2–4 show various signal characteristics of the system. As shown in FIG. 1, a derivative gain is a gain of auxiliary assist current determining processing 101d, and the differentiation is a value (differential value of an output signal of the torque sensor) of an output signal of torque sensor 95a differentiated by auxiliary assist current determining processing 101d.

An EEPROM of electric power steering system 1 stores, in addition to various data stored in EEPROM 96g, the following data: data concerning magnitude of the steering torque, and data concerning magnitude of derivative gain corresponding to the magnitude of the steering torque. The former data and the latter data are associated with each other and stored in the EEPROM. Further, data concerning the differential value of the output signal of torque sensor 95a and data concerning magnitude of the derivative gain corresponding to the differential value of the output signal of the torque sensor are also stored in the EEPROM in association with each other.

In addition to control programs stored in ROM 96f, control programs concerning first gain control processing 2 and second gain control processing 3 are stored in the ROM of the electric power steering system. That is, in the electric power steering system, first gain control processing 2 and second gain control processing 3 are in addition to the processing executed by electric power steering system 91.

As shown in FIG. 2, first gain control processing 2 is processing in which when a value of the steering torque (output signal of torque sensor 95a) is smaller than first predetermined value 4, the derivative gain (gain of auxiliary assist current determining processing 101d) is set to zero. Thus, when the output signal of torque sensor 95a is smaller than first predetermined value 4, even if torque sensor 95a detected vibrations received from road surface or vibrations generated from the motor, it is possible to prevent the noise component from being included in the assist current. That is, it is possible to prevent the assist force from being varied in terms of vibrations. The fact that the output signal value of torque sensor 95a is small means that the vehicle drives substantially straight. Therefore, it is possible to prevent the steering from being unstable when the vehicle is driving straight.

As described above, torque sensor 95a adversely detects the vibration, but if the vibration detected by the torque sensor is high frequency, the delay time (the time between the instant when the torque sensor detects the steering torque and the instant when the assist force is transmitted to rack 100 through assist pinion 99) becomes relatively long, and the assist force is adversely applied in a direction opposite from a direction to which the steering torque is applied. However, even in such a case, it is possible to prevent the steering from being unstable. Thus, even if the vehicle is a racing car, for example, it is possible to prevent the steering from being unstable.

As shown in FIG. 3, second gain control processing 3 is processing for setting the derivative gain to zero when the differential value is smaller than second predetermined value 5. Second gain control processing 3 is executed when the output voltage value of torque sensor 95a is equal to or greater than first predetermined value 4. Therefore, if the differential value of the output signal of the torque sensor is smaller than second predetermined value 5, even if the output signal value of the torque sensor is equal to first predetermined value 4 or greater, when the vibrations received from the road surface or vibrations generated from the motor is detected by torque sensor 95a, it is possible to prevent the noise component from being included in the current flowing to electric motor 97, that is, to prevent the assist force from being varied in terms of vibrations. Here, the fact that the output signal value of the torque sensor is equal to or greater than first predetermined value 4 means that the vehicle is turning. Thus, it is possible to prevent the steering from being unstable when the vehicle is turning. First gain control processing 2 and second gain control processing 3, shown in FIG. 1 may be switched with each other.

Referring to FIGS. 1–4, basic assist current determining processing 6 is the same as basic assist current determining processing 101a, but is different from basic assist current determining processing 101a in that the first basic assist current value is set to 0A when the output signal value of torque sensor 95a is smaller than third predetermined value 6a. Therefore, it is possible to prevent the steering from being unstable when the torque sensor detects vibrations received from the road surface or vibrations received from the motor even if the derivative gain is set to zero by second gain control processing 3.

The operation of electric power steering system 1 having the above-described construction will be explained next. If the driver turns steering wheel 92, torque sensor 95a detects the steering torque and has an output signal corresponding to the magnitude of the steering torque. If the signal is output from torque sensor 95a, first A/D converter 96a converts the output signal of the torque sensor into digital value. After the torque sensor output signal is converted into the digital value, auxiliary assist current determining processing 101d is executed by CPU 96d. That is, the output signal of torque sensor 95a is differentiated. After auxiliary assist current determining processing 101d is executed, first gain control processing 2 is executed by CPU 96d. That is, when the output voltage value of torque sensor 95a is smaller than first predetermined value 4, the derivative gain is set to zero.

When the output voltage value of torque sensor 95a is smaller than first predetermined value 4, the derivative gain is set to zero by CPU 96d. Thus, even if the torque sensor detects vibrations received from the road surface or vibrations generated from the motor, it is possible to prevent the steering from being unstable when the vehicle drives straight.

On the other hand, when the output signal value of torque sensor 95a is equal to or greater than first predetermined value 4, auxiliary assist current determining processing 101d is executed and then, second gain control processing 3 is executed. That is, if the differential value of the output signal of torque sensor 95a is smaller than second predetermined value 5, the derivative gain is set to zero.

In this manner, when the output signal value of torque sensor 95a is equal to or greater than first predetermined value 4 and the differential value of the output signal of the torque sensor is smaller than second predetermined value 5, the derivative gain is set to zero. Thus, it is possible to prevent the steering from being unstable that could otherwise be caused when torque sensor 95a detects vibrations received from the road surface or vibrations generated from the motor, even when the vehicle is turning.

After the output signal of torque sensor 95a is converted into a digital value, basic assist current determining processing 6 is also executed by CPU 96d. That is, the first basic assist current value is determined based on the output signal value that was converted into the digital value from torque sensor 95a. If the output signal value of the torque sensor is smaller than third predetermined value 6a, the first assist current value is set to zero by basic assist current determining processing 6. Therefore, it is possible to prevent the steering from being unstable if the torque sensor detects vibrations received from the road surface or vibrations generated from the motor, even if the derivative gain is set to zero by first gain control processing 2 or second gain control processing 3.

Meanwhile, the vehicle speed is detected by vehicle speed sensor 95b. If the vehicle speed is detected by the vehicle speed sensor, a signal corresponding to the value of the vehicle speed is output by the vehicle speed sensor. Any output signal from the vehicle speed sensor is converted into digital value by second A/D converter 96b. After the output signal is converted into a digital value, vehicle speed corresponding ratio determining processing 101b is executed by CPU 96d. That is, the vehicle speed corresponding ratio is determined in accordance with a value of the output signal of vehicle speed sensor 95b.

After the first basic assist current value and the vehicle speed corresponding ratio are determined, vehicle speed corresponding ratio multiplying processing 101c is executed by CPU 96d. That is, processing for multiplying the first basic assist current value by the vehicle speed corresponding ratio is executed to obtain the second assist current. After vehicle speed corresponding ratio multiplying processing 101c is executed, an output signal (differential value of the output signal of the torque sensor) of torque sensor 95a differentiated by auxiliary assist current determining processing 101d in accordance with the derivative gain determined by first gain control processing 2 or second gain control processing 3 is added to the second basic assist current. The second basic assist current value after the differential value of the output signal of the torque sensor is added is the assist current value. That is, a value of current flowing to electric motor 97.

The present invention has been explained based on the first embodiment, and it will be easily understood that the invention is not limited to the above-described embodiment, and it may variously be improved without departing from the subject matter of the invention.

Figure 5:
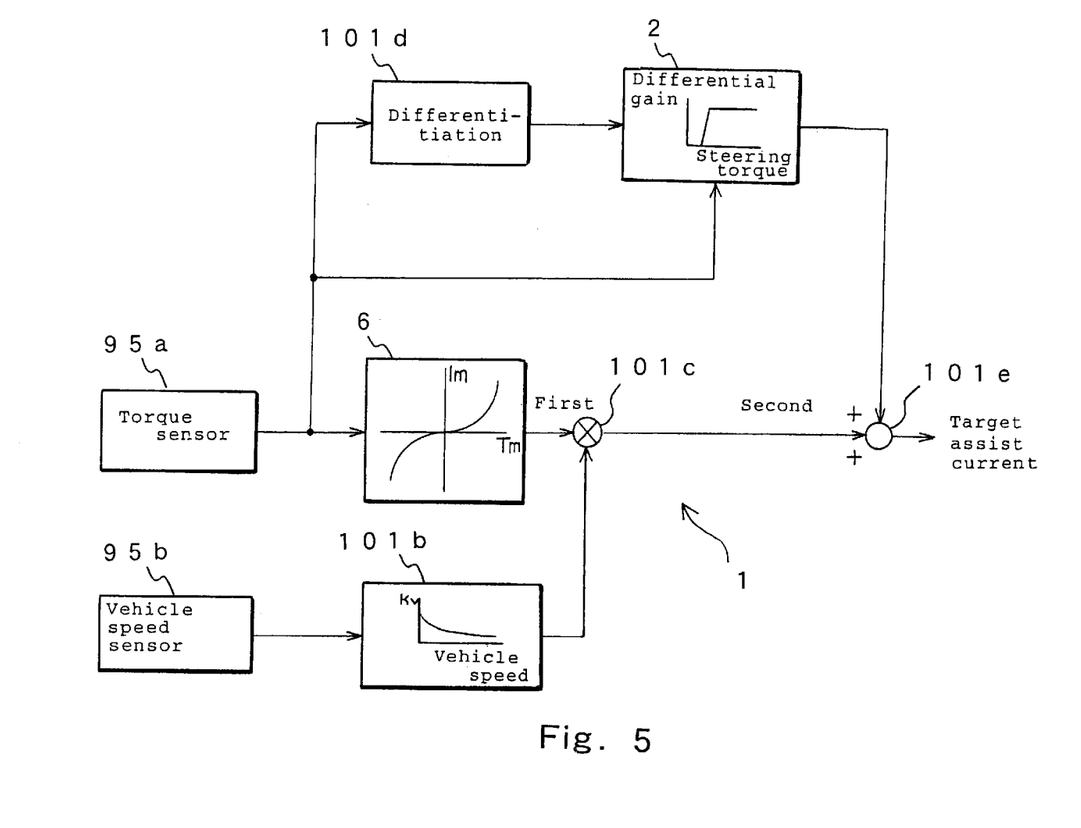
FIG. 5 is a basic control block diagram of the electric power steering system according to an alternative embodiment.
Figure 6:
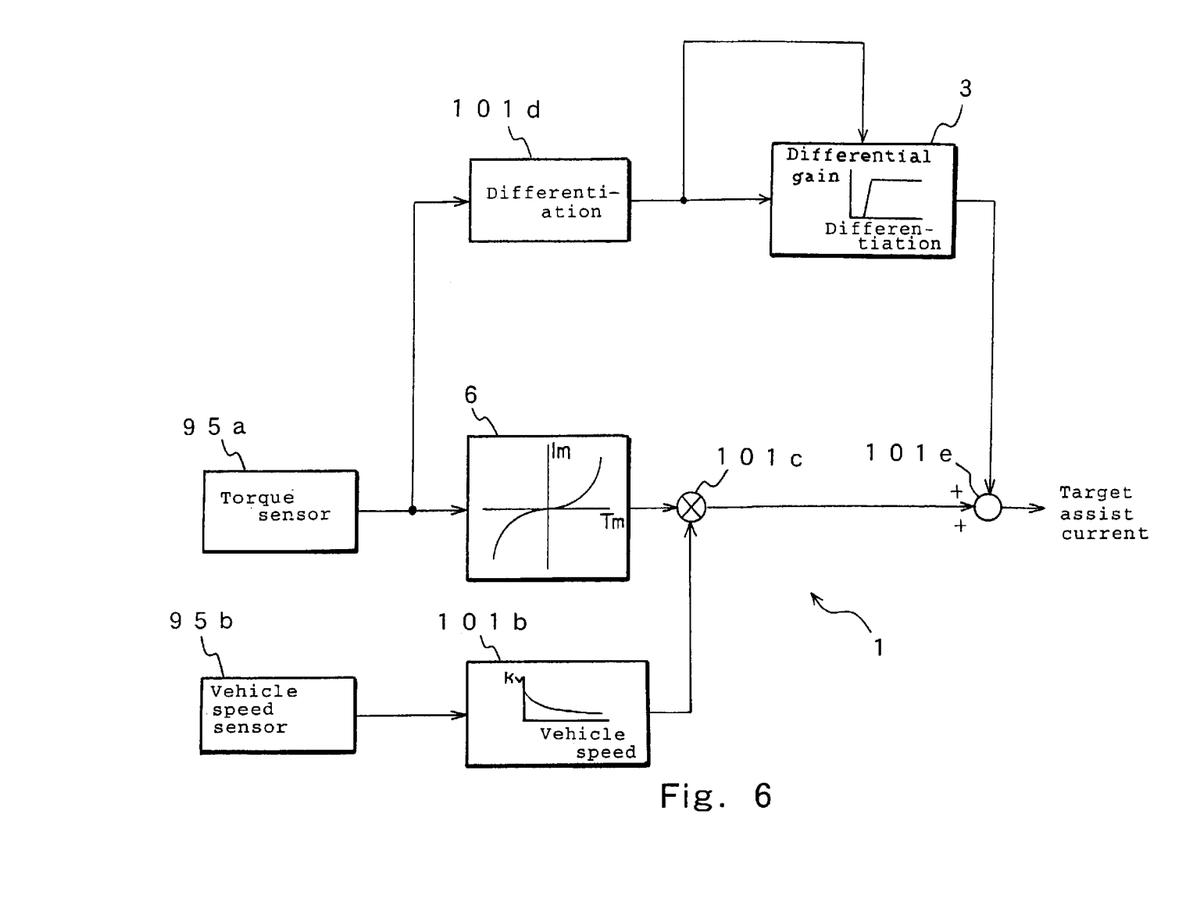
FIG. 6 is a basic control block diagram of the electric power steering system according to still another embodiment.
Figure 7:
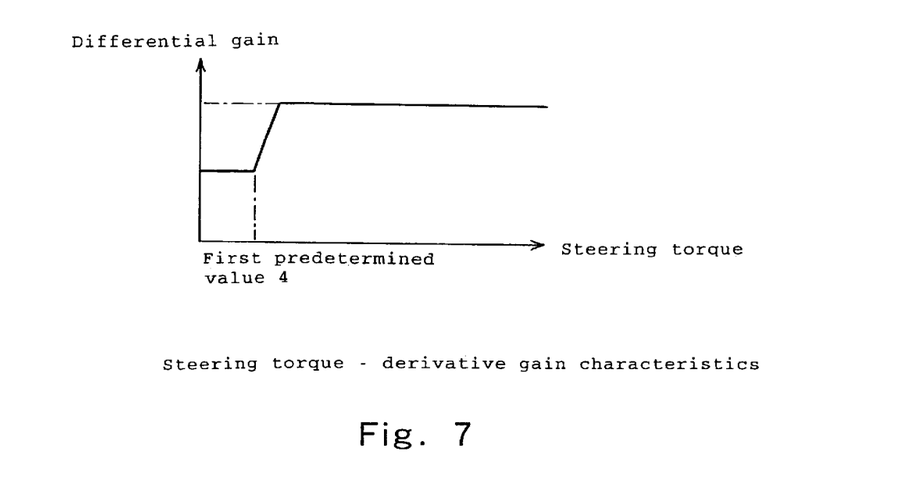
FIG. 7 shows steering torque—derivative gain characteristics of the electric power steering system of another embodiment of the invention.

For example, in electric power steering system 1, the programs concerning first gain control processing 2 and second gain control processing 3 are stored in the ROM. That is, both first gain control processing 2 and second gain control processing 3 can be executed. However, it is not always necessary to execute both the first gain control processing and the second gain control processing, and only the first gain control processing may be executed as shown in FIG. 5, or only the second gain control processing may be executed as shown in FIG. 6. When it is arranged such that only first gain control processing 2 is executed, it is possible to prevent the steering from being unstable when the vehicle drives straight. If it is arranged such that only second gain control processing 3 is executed, it is possible to prevent the steering from being unstable when the vehicle is turning.

Figure 8:
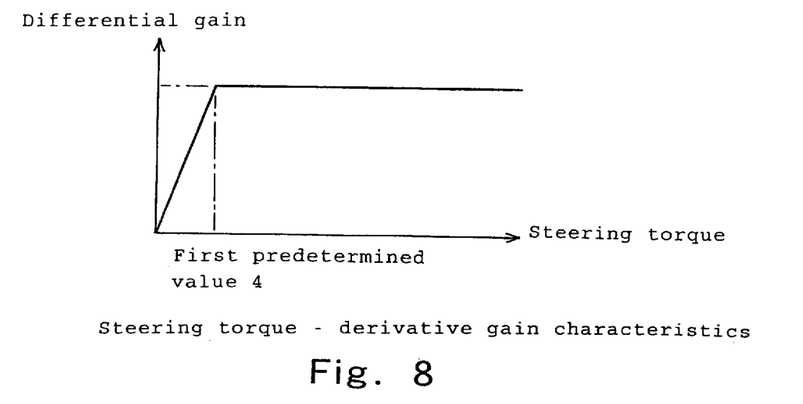
FIG. 8 shows steering torque—derivative gain characteristics of the electric power steering system of yet another embodiment.
Figure 9:
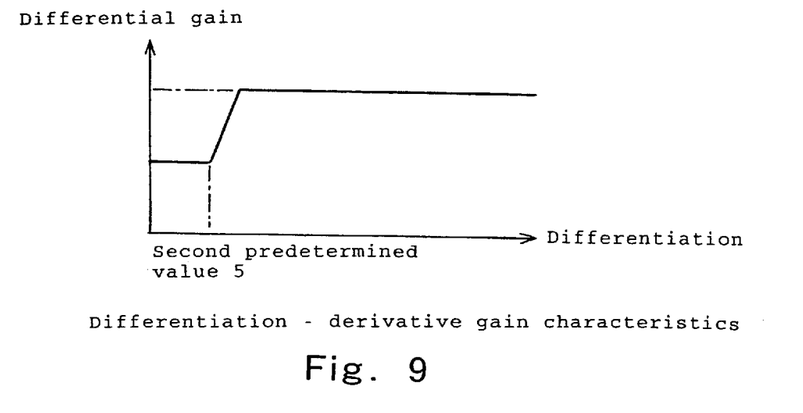
FIG. 9 shows differentiation—derivative gain characteristics of the electric power steering system of still another embodiment.

In electric power steering system 1, when a value of the output signal of torque sensor 95a is smaller than first predetermined value 4 in first gain control processing 2, the gain (derivative gain) of auxiliary assist current determining processing 101d is set to zero. However, first gain control processing 2 may not always bring the derivative gain to zero, and the first gain control processing may reduce the derivative gain to a small value (for example, any magnitude from 0.1 times to 0.9 times), or the steering torque and the derivative gain may be proportional to each other, as shown in FIG. 8.

Figure 10:
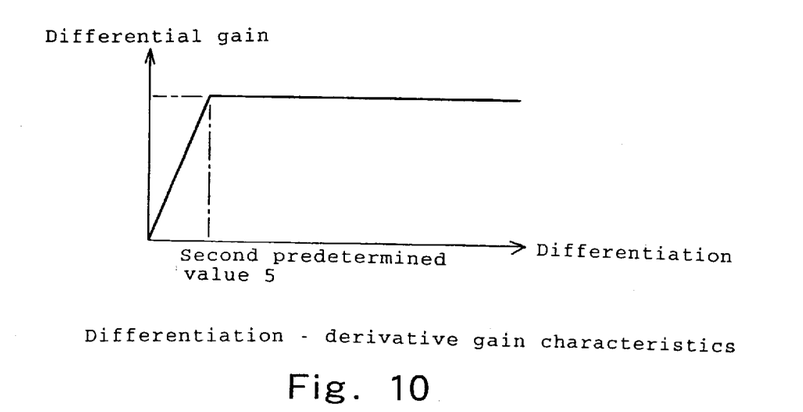
FIG. 10 shows differentiation—derivative gain characteristics of the electric power steering system of a further embodiment.

Similarly, when the output signal (differential value of the output signal of the torque sensor) of torque sensor 95a differentiated by auxiliary assist current determining processing 101d is smaller than second predetermined value 5, the derivative gain is set to zero. However, first gain control processing 2 may not always set the derivative gain to zero, and the first gain control processing may reduce the derivative gain to a small value (for example, any magnitude from 0.1 times to 0.9 times), or the differential value of the output signal of torque sensor 95a and the derivative gain may be proportional to each other, as shown in FIG. 10.

Further, although the various data is stored in the EEPROM in electric power steering system 1, the data stored in the EEPROM may be function data. More specifically, function data of the magnitude of the steering torque and the assist current value may be stored, function data of the magnitude of the vehicle speed and the vehicle speed corresponding ratio may be stored, function data of the magnitude of the steering torque and magnitude of the derivative gain may be stored, or function data of the differential value of the output signal of torque sensor 95a and magnitude of the derivative gain may be stored.

In electric power steering system 1, CPU 96d executes the auxiliary assist current determining processing to differentiate the output signal of torque sensor 95*a*. However, CPU 96*d* may not always differentiate the output signal of the torque sensor, and the output signal may be differentiated by a differential circuit (comprising capacitor and resistance).

In the above embodiment, first gain control processing 2 is processing executed by gain control means. Second gain control processing 3 is processing executed by second control means. Basic assist current determining processing 6 is processing executed by assist current determining means or by processing executed by second assist current determining processing. Auxiliary assist current adding processing 101*e* is processing executed by assist current determining means.

As used herein, the term "differentiation" includes a meaning that from an output signal of the torque sensor in a certain time, an output signal of the torque sensor in another time is subtracted. It is preferable that the certain time is later as compared to the other time.

According to the electric power steering system of the first aspect of the invention, when the output signal of the torque sensor is smaller than the predetermined value, the gain of the derivative means is set to zero or is reduced by the gain control means. Thus, even if the torque sensor detects vibrations received from the road surface or vibrations generated from the motor, it is possible to prevent the noise component from being included in the current flowing to the drive means, so as to prevent the assist force from being varied in terms of vibrations. Thus, it is possible to prevent the steering from being unstable when the vehicle drives straight. Further, even if the vibrations detected by the torque sensor are high frequency, it is possible to prevent the steering from being unstable.

According to the electric power steering system of the second aspect of the invention, when the output signal from the derivative means is smaller than the predetermined value, the gain of the derivative means is set to zero or is reduced by the second gain control means. Thus, even if the torque sensor detects vibrations received from the road surface or vibrations generated from the motor, it is possible to prevent the noise component from being included in the current flowing to the drive means, so as to prevent the assist force from being varied in terms of vibrations. Thus, it is possible to prevent the steering from being unstable when the vehicle is turning. Further, even if the vibrations detected by the torque sensor are high frequency, it is possible to prevent the steering from being unstable.

According to the electric power steering system of the third aspect of the invention, in addition to the effect of the electric power steering system of the second aspect, when the output signal of the torque sensor is smaller than the predetermined value, the gain of the derivative means is set to zero or is reduced by the gain control means. Thus, even if the torque sensor detects vibrations received from the road surface or vibrations generated from the motor, it is possible to prevent the noise component from being included in the current flowing to the drive means, so as to prevent the assist force from being varied in terms of vibrations. Thus, it is possible to prevent the steering from being unstable when the vehicle drives straight. Further, even if the vibrations detected by the torque sensor are high frequency, it is possible to prevent the steering from being unstable.

According to the electric power steering system of the fourth aspect of the invention, in addition to the effect of the electric power steering system of any one of the first to third aspects, when the output signal of the torque sensor is smaller than the predetermined value, since the value of current flowing to the drive means is determined as 0A by the second assist current determining means, it is possible to prevent the steering from being unstable if the torque sensor detects vibrations received from the road surface or vibrations generated from the motor, even if the gain of the derivative means is set to zero by the gain control means or the second gain control means.

The present invention has been described using various preferred embodiments. It is to be noted that these embodiments are presented only to describe the present invention and not to limit the scope of the present invention. Accordingly, the present invention is limited only by the appended claims and equivalents thereto.

What is claimed is:

1. An electric power steering system comprising:
   a torque sensor for outputting a signal corresponding to a value of a steering torque, said signal comprising a torque sensor output signal;
   a derivative means for outputting a signal obtained by differentiating the output signal of said torque sensor, said signal comprising a derivative means output signal;
   a driving means for electrically driving an assist apparatus which assists a steering force; and
   an electronic control unit (ECU) which performs the following steps to determine current flowing to said driving means;
   determining a first assist current in accordance with the torque sensor output signal and setting the first assist current to zero when the torque sensor output signal is smaller than a predetermined value;
   adding the derivative means output signal to the toque sensor output signal; and
   setting a gain of said derivative means to zero, or reducing the gain, when the torque sensor output signal is smaller than a predetermined value.

2. The electric power steering system according to claim 1, said derivative means further comprising an ECU which determines a second assist current.

3. The electric power steering system according to claim 2, wherein said ECU further sets a value of current flowing to said driving means to 0A.

4. An electric power steering system comprising:
   a torque sensor for outputting a signal corresponding to a value of a steering torque, said signal comprising a torque sensor output signal;
   a derivative means for outputting a signal obtained by differentiating the output signal of said torque sensor, said signal comprising a derivative means output signal;
   a driving means for electrically driving an assist apparatus which assists a steering force; and
   an electronic control unit (ECU) which performs the following steps to determine current flowing to said driving means;
   determining a first assist current in accordance with the torque sensor output signal and setting the first assist current to zero when the torque sensor output signal is smaller than a predetermined value;
   adding the derivative means output signal to the torque sensor output signal; and
   setting a gain of said derivative means to zero, or reducing the gain, when the derivative means output signal is smaller than a predetermined value.

5. The electric power steering system according to claim 4, said ECU further performing the step of setting the gain of said derivative means to zero, or reducing the gain, when the torque sensor output signal is smaller than a predetermined value.

6. The electric power steering system according to claim 5, wherein said ECU further sets a value of current flowing to said driving means to 0A.

7. The electric power steering system according to claim 4, said derivative means further comprising an ECU which determines a second assist current and which sets a value of current flowing to said driving means to 0A in relation to said second assist current.

8. The electric power steering system according to claim 4, said derivative means further comprising an ECU which determines a second assist current.

* * * * *